(12) United States Patent
Natarajan et al.

(10) Patent No.: US 8,644,323 B2
(45) Date of Patent: Feb. 4, 2014

(54) DISTRIBUTED MANAGEMENT OF LEO SATELLITE NETWORKS WITH MANAGEMENT AGILITY AND NETWORK EFFICIENCY

(75) Inventors: Narayanan Natarajan, Marlboro, NJ (US); Anindo Bagchi, Ocean, NJ (US); William Edward Stephens, Bel Air, MD (US); Stephen Leanheart, Ellicott City, MD (US)

(73) Assignee: Telcordia Technologies, Inc., Piscataway, NJ (US)

( * ) Notice: Subject to any disclaimer, the term of this patent is extended or adjusted under 35 U.S.C. 154(b) by 74 days.

(21) Appl. No.: 13/368,131

(22) Filed: Feb. 7, 2012

(65) Prior Publication Data

US 2013/0039264 A1 Feb. 14, 2013

Related U.S. Application Data

(60) Provisional application No. 61/440,134, filed on Feb. 7, 2011.

(51) Int. Cl.
*H04L 12/28* (2006.01)
*H04B 7/185* (2006.01)
*H04W 4/00* (2009.01)
*H04N 7/20* (2006.01)

(52) U.S. Cl.
USPC ............. 370/400; 455/12.1; 455/427; 725/63

(58) Field of Classification Search
None
See application file for complete search history.

(56) References Cited

U.S. PATENT DOCUMENTS

| 4,720,873 | A   * | 1/1988  | Goodman et al. ............... 725/32 |
|-----------|-------|---------|---------------------------------------|
| 6,898,467 | B1  * | 5/2005  | Smith et al. ..................... 700/20 |
| 2002/0013149 | A1 * | 1/2002  | Threadgill et al. ............ 455/427 |
| 2002/0087992 | A1 * | 7/2002  | Bengeult et al. ................ 725/76 |
| 2010/0269143 | A1 * | 10/2010 | Rabowsky ....................... 725/63 |
| 2012/0263042 | A1 * | 10/2012 | Natarajan et al. ............. 370/238 |

OTHER PUBLICATIONS

P. Todorova, "Network Management in LEO Satellite Networks", Proceedings of the 35th Hawaii International Conference on System Sciences, 2002.
Z. Wenbo, S. Peigen, "Design of Communication Primitives for Satellite Network Management," 6th International Conference on Wireless Communications Networking and Mobile Computing (WiCOM), 2010.
V.V.Gounder, R. Prakash, H. Abu-Amara, "Routing in LEO-Based Satellite Networks," Emerging Technologies Symposium on Wireless Communications and Systems, pp. 22.1-22.6, Apr. 1999.
International Application No. PCT/US2012/024158—PCT International Search Report dated Apr. 2, 2012.

* cited by examiner

*Primary Examiner* — Clemence Han
(74) *Attorney, Agent, or Firm* — Philip J. Feig

(57) ABSTRACT

In a distributed management scheme for LEO satellite networks interactions between a satellite and the designated fixed center occur according to a time schedule and only when the designated center is in the coverage area of the payload. For exception/alarm reporting and real-time configuration updates the interaction varies with time. Interactions of this type occur between a satellite and the management center that is "nearest" to the payload or satellite at the time instant at which the network event occurs or configuration upload is needed. The nearest management center for a payload is the center that can be reached from the payload with fewest number of crosslink hops. A central network operation center determines, prior to payload launch, the association between satellites and management centers for routine information exchange, and the nearest management center for the payload for different snapshots of time.

11 Claims, 2 Drawing Sheets

DISTRIBUTED MANAGEMENT OF LEO SATELLITE NETWORKS WITH MANAGEMENT AGILITY AND NETWORK EFFICIENCY

CROSS-REFERENCE TO RELATED APPLICATIONS

This application claims the benefit of U.S. Provisional Application No. 61/440,134, filed on Feb. 7, 2011, which is incorporated by reference herein in its entirety.

This application is related to U.S. patent application Ser. No. 13/149,106 filed May 31, 2011, entitled "Context Aware Adaptive Switching in Reconfigurable Low Earth Orbit Satellite Networks" which is incorporated by reference herein in its entirety.

This application is related to U.S. patent application Ser. No. 13/252,711 filed Oct. 4, 2011, entitled "Method and System for Determination of Routes in LEO Satellite Networks with Bandwidth and Priority Awareness and Adaptive Rerouting" which is incorporated herein by reference in its entirety.

FIELD OF THE INVENTION

The present invention relates generally to Low Earth Orbit (LEO) satellite networks, and specifically to a distributed management scheme for LEO satellite networks addressing the issue of the assignment of management responsibility of each center in terms of payloads managed by each center (i.e., management domain) and the management functions performed by each center, such that network management is performed with agility (timeliness) and network efficiency.

BACKGROUND OF THE INVENTION

Use of Low Earth Orbit (LEO) satellite networks is a promising approach for global broadband communications in view of their low delay and bit error characteristics compared to Geostationary (GEO) satellites. Due to their orbit, the communication link between a ground terminal and an LEO satellite will be available periodically only for a few minutes. In order to provide continuous communication between ground terminals, the LEO satellites need to be interconnected via inter-satellite links (called crosslinks) and terminal-terminal data traffic will be muted over multiple satellites using these crosslinks. Typically, an LEO satellite network consists of multiple orbit planes, and each plane consists of multiple satellites. The satellite topology (neighbor relationship) within a plane remains invariant while inter-plane topology will change constantly; interplane crosslinks will be dynamically set up and removed. Terminal-satellite associations (uplink and downlink connectivity) will also be changing constantly.

Real-time management of such a dynamically changing network is a complex problem. Network configuration information for provisioning new user services including route information for user traffic needs to be uploaded to relevant payloads from the network operations center in the ground in a timely manner. The operations center needs to monitor the status and performance of payloads. When problems occur in the satellite network, the operations center needs to quickly determine the root cause of the problem and perform corrective actions. In addition to timeliness, management should be accomplished with network efficiency; i.e., satellite network bandwidth used for management communication should be as low as possible so that maximum network bandwidth is available for user traffic.

These two goals are difficult to achieve in a LEO satellite network if a centralized management architecture is employed. In the centralized architecture, all management functions are performed by a single management center in the ground that has direct connectivity only to a single payload at any given time. Hence, management traffic between the payloads and the center will need to traverse multiple crosslinks in the satellite network. This increases management communication delay as well as the crosslink bandwidth utilized for management traffic. These drawbacks can be overcome by employing a distributed management architecture. In this architecture, multiple management centers are deployed on the ground in various geographical locations to reduce management communication delay and crosslink bandwidth utilized for management traffic.

Employment of a distributed management architecture for LEO satellite networks is a challenging problem. Determination of how many management centers to deploy, where to deploy, and the payload distribution among these centers are important issues. In the case of GEO satellite networks, due to fixed terminal-satellite connectivity made possible by geosynchronous satellite orbit and the wide coverage area of each satellite, it is possible to deploy a few centers such that each center is in the coverage area of a satellite and each satellite has a center in its coverage area. This is not possible for LEO satellite networks due to the limited coverage area and the constantly changing coverage area of each satellite.

Several proposals have been made for distributed management for LEO satellite networks.

P. Todorova, in Network Management in LEO Satellite Networks, Proceedings of the 35th Hawaii International Conference on System Sciences, 2002 proposes a distributed management architecture for ATM LEO satellite networks. The distributed architecture is focused on the management functionality split between the LEO payloads and the Network Control Center (NCC) on the ground. Todorova does not address the concept of multiple management centers collectively managing the LEO satellite network. In this architecture, management traffic between payloads and the NCC will traverse multiple crosslinks. This architecture does not address our objectives of minimizing management communication latency and reducing crosslink bandwidth utilized by management traffic.

Wenbo et al., in Z. Wenbo, S. Peigen, Design of Communication Primitives for Satellite Network Management, 6th International Conference on Wireless Communications Networking and Mobile Computing (WiCOM), 2010, propose a distributed management architecture for satellite networks. In this architecture, there is a central manager and multiple intermediate managers on the ground. The central manager collects management information from satellites via the intermediate managers. The management domain of an intermediate manager is dynamically determined and the domain varies over time. Each intermediate manager broadcasts login packets. Satellite nodes that receive login packets register with an intermediate manager by responding to its login packet. If a satellite node receives login packets from multiple managers, it chooses the manager that can be reached with minimum delay. It does this by sending "delay test" packets and determining the delay. Based on its orbit, a satellite may register with different intermediate managers at different times. This approach ensures that management communication does not traverse crosslinks thus reducing management communication latency and overhead. But, this scheme requires that management centers are widely deployed across the globe such that each satellite will always have at least one management center within its coverage area. This tremendously increases the management system deployment cost and does not seem feasible from a commercial operations perspective.

Gounder et al. in V. V. Gounder, R. Prakash, H. Abu-Amara, Routing in LEO-Based Satellite Networks, 1999 describe a scheme where multiple management centers with ground stations are deployed in the ground for uploading routing tables to LEO satellites. A management center uploads updated routing tables to a satellite when the satellite passes over it. Thus, this scheme caters to situations where periodic uploading of configuration data to the satellites is adequate. In contrast, the present invention supports both such periodic updates as well as exchange of management data between the satellites and the management centers that have more stringent latency requirements, such as alarms and real-time configuration changes to the payloads for rapid provisioning of user services.

The distributed management scheme for LEO satellite networks that is described in the present invention differs from the previous solutions described in the prior art in the following ways:

Firstly, the previous solutions use either fixed associations between the management centers and satellites or constantly changing associations between them. The former approach increases management communication latency and overhead traffic on crosslinks. The latter approach reduces latency and overhead. But, since the domain of a management center changes periodically and the center has status and performance information concerning a payload only for a limited time, it is not possible for management centers to perform meaningful performance data aggregation and summarization.

Secondly, the scheme described in the present invention is a hybrid approach where the management center with which a payload communicates is dependent on the type of management communication. Routine management functions are performed based on fixed management associations while time critical management functions for a payload are performed by the nearest center. The benefits are reduced latency and overhead for management communications and management centers can perform performance data aggregation and summarization.

Thirdly, in the present invention, the nearest centers are predetermined by the central network operations center (NOC) leveraging the time deterministic topology changes that occur in an LEO satellite network. This avoids additional communication exchanges between payloads and management centers, such as those described in Wenbo et al.

The present invention is a management scheme that provides management agility with network efficiency while enabling management aggregation capabilities in the distributed centers to reduce the amount of management information exchanged between the distributed management centers and the central network operations center.

SUMMARY OF THE INVENTION

Real-time management of a LEO satellite network is a complex problem. Network configuration information for provisioning new user services including route information for user traffic needs to be uploaded to relevant payloads from the network operations center on the ground in a timely manner. The operations center needs to monitor the status and performance of payloads. When problems occur in the satellite network, the operations center needs to quickly determine the root cause of the problem and perform corrective actions. In addition to timeliness, management should be accomplished with network efficiency; i.e., satellite network bandwidth used for management communication should be as low as possible so that maximum network bandwidth is available for user traffic.

These two goals are difficult to achieve if a centralized management architecture is employed. In the centralized architecture, all management traffic between the payloads and the center will need to traverse multiple crosslinks. This increases management communication delay as well as the crosslink bandwidth utilized for management traffic. These drawbacks are overcome by employing a distributed management architecture in which multiple management centers are deployed on the ground. In the case of GEO satellite networks, due to fixed location of satellites and the wide coverage area of each satellite, it is possible to deploy a few centers such that each center is in the coverage area of a satellite and each satellite has a center in its coverage area. This is not possible for LEO satellite networks due to the limited coverage area and the constantly changing coverage area of each satellite.

In the proposed architecture, the management center that a payload communicates with depends on the type of management interaction. For routine management exchanges, such as periodic payload status reporting, performance data reporting, and payload configuration upload that is not time sensitive (e.g., software configuration updates), the association is fixed and does not vary with time. The payload distribution among management centers for this type of interaction is at plane granularity. That is, a management center manages payloads in one or more planes, and all payloads in a plane are managed by the same center. Interactions of this type between a payload and the designated fixed center occur according to a time schedule and only when the designated center is in the coverage area of the payload. Thus, these exchanges use only the up/down links between the payload and the management center.

For exception/alarm reporting and real-time configuration updates (such as mission traffic route upload), the association varies with time. Interactions of this type occur between a payload and the management center that is "nearest" to the payload at the time instant at which the network event occurs or configuration upload is needed. The nearest management center for a payload is the center that can be reached from the payload with fewest number of crosslink hops. Since multiple management centers are distributed geographically in the ground and the satellite orbit changes in a time-deterministic manner, the nearest center will dynamically vary; i.e., at different time instants, different centers are the nearest centers for a payload.

The central network operations center determines, prior to payload launch, the nearest management center for the payload for different snapshots. Using a routing algorithm described hereinbelow, the central operations center determines the payload-center association for each snapshot.

The present invention presents is a distributed management scheme for LEO satellite networks addressing the issue of assignment of management responsibility of each center in terms of payloads managed by each center (i.e., management domain) and the management functions performed by each center, such that network management is performed with agility (timeliness) and network efficiency. The invention does not address the problems of how many centers to deploy and where to deploy them. But given a physical deployment of the management centers, the invention can be used to define the management responsibility of each center.

The present invention presents a method for assigning responsibilities for managing a LEO satellite network to multiple distributed ground based network management centers such that management communication delay between payloads and centers is minimized, crosslink bandwidth used for management communication is minimized, and performance data aggregation is enabled at management centers.

The invention will be better understood when the following description is read in conjunction with the accompanying drawings.

DETAILED DESCRIPTION

Figure 1:
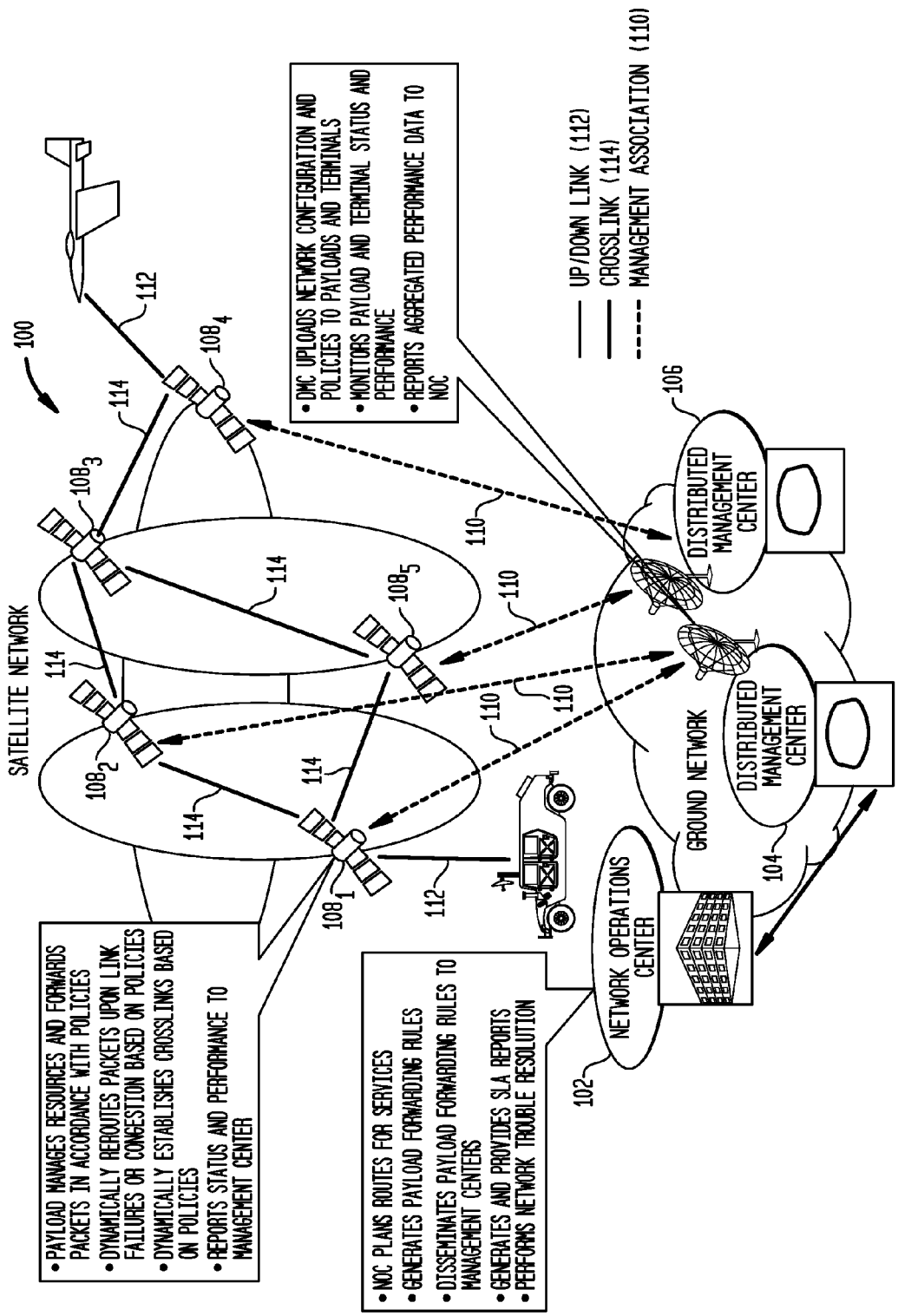
FIG. 1 is a schematic representation of an LEO satellite distributed management system.

Referring now to the figures and to FIG. 1 in particular, there is shown an envisioned distributed management scheme for LEO satellite network 100. In this scheme, there is a central Network Operations Center (NOC) 102 and a set of Distributed Management Centers (DMCs) 104, 106 on the ground. The NOC performs the network planning function. Depending on the capabilities of the payloads, it plans either satellite network routes (paths) for user services or establishes routing policies for user services. It uploads the route/policy information to the payloads via the DMCs. Each DMC has management jurisdiction over a subset of satellites $108_1$-$108_5$. That is, DMC 104 has jurisdiction over satellites $108_1$ and $108_2$ and DMC 106 has jurisdiction over satellites $108_3$, $108_4$, and $108_5$. Each DMC serves as the management front-end for satellites within its management domain. Thus, configuration directives from the NOC are uploaded to a payload via the associated management center, and monitoring information from a payload is sent to the Network Operations Center via the associated management center.

In this scheme, the management center that a payload communicates with depends on the type of management interaction. For routine management exchanges, such as periodic payload status reporting, performance data reporting, and payload configuration upload that is not time sensitive (e.g., software configuration updates), the association is fixed and does not vary with time. The payload distribution among DMCs for this type of interaction is at plane granularity. That is, a DMC manages payloads in one or more planes, and all payloads in a plane are managed by the same DMC. Interactions of this type between a payload and the designated fixed DMC occur according to a time schedule and only when the designated DMC is in the coverage area of the payload. Thus, these exchanges use only the up/down links 110 between the payload and the DMC.

For exception/alarm reporting and real-time configuration updates (such as mission traffic route upload) 112, the association varies with time. Interactions of this type occur between a payload and the management center that is "nearest" to the payload at the time instant at which the network event occurs or configuration upload is needed. The nearest management center for a payload is the center that can be reached from the payload with fewest number of crosslink hops 114. Since multiple management centers are distributed geographically on the ground and the satellite orbit changes in a time-deterministic manner, the nearest center will dynamically vary; i.e., at different time instants, different centers are the nearest centers for a payload.

Based on satellite orbits and predicted changes in ground-satellite connectivity, the central NOC determines, prior to payload launch, the nearest DMC for the payload for different time instants. In an LEO satellite network, the satellite network topology changes in a time deterministic and recurring manner. A snapshot represents the actual satellite network topology for a specific time interval. An epoch is the shortest cyclic time interval such that the same sequence of topology changes is repeated in each epoch. All topology changes in the satellite network are entirely captured by the sequence of snapshots within an epoch. Since the sequence of snapshots is the same in each epoch, it is sufficient that the NOC determines the payload-center association for each snapshot within an epoch.

Figure 2:
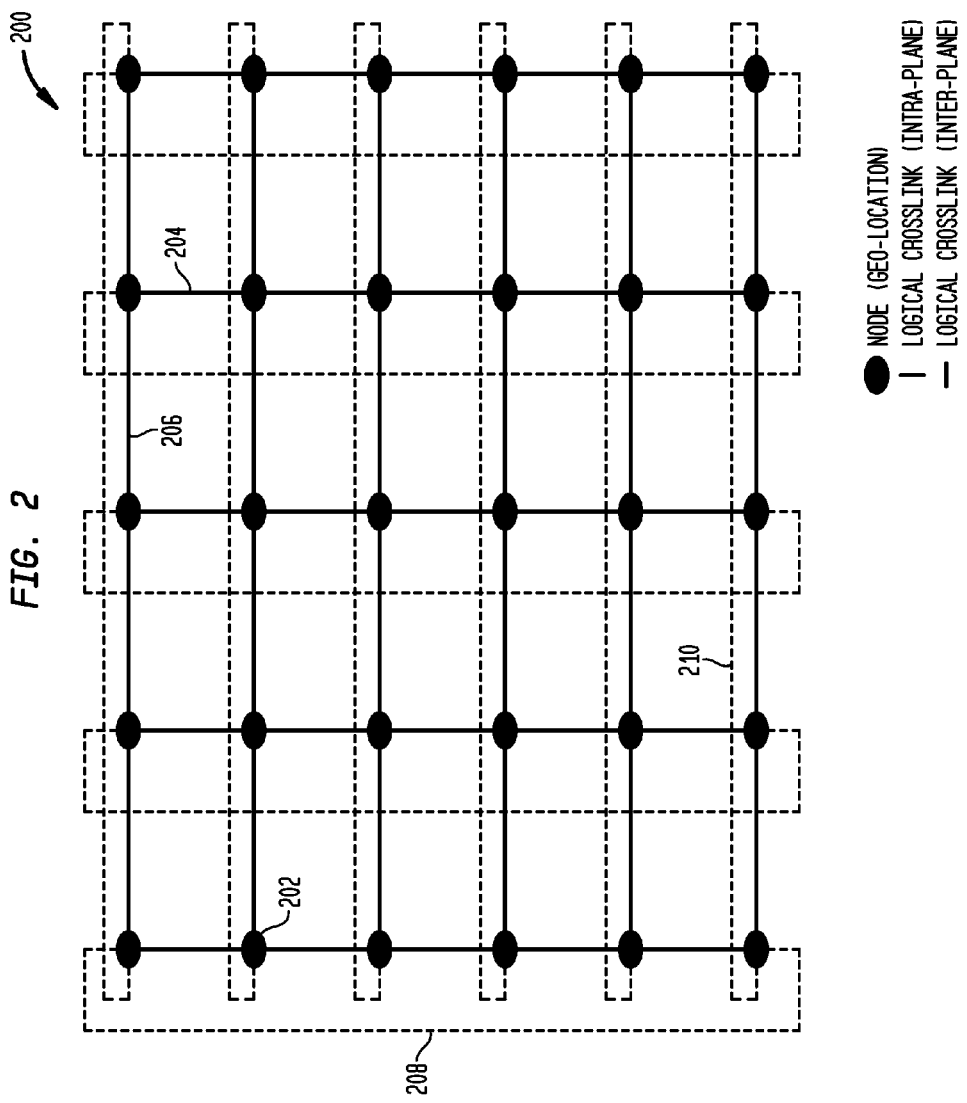
FIG. 2 is a schematic representation of a LEO satellite grid.

A simple algorithm for the nearest center determination for all snapshots within an epoch is described below using the concept of LEO Satellite Grid and Logical Node described in U.S. patent application Ser. No. 13/252,711. The satellite network snapshots are represented using the concept of LEO Satellite Grid (hereafter called the Grid) as shown in FIG. 2. The Grid 200 represents a fixed logical satellite network (constellation) consisting of Nodes 202 connected via vertical edges 204 and horizontal edges 206. A Node represents a geolocation. The geolocations are chosen such that at any time, the LEO satellites at these locations together provide global coverage. A vertical edge represents a Logical Intra-Plane Crosslink, and a horizontal edge represents a Logical Inter-Plane Crosslink. Nodes in the top row and the bottom row are the same and this is denoted by the dotted lines 208 between these nodes. Similarly, nodes in the left most column and right most column are the same and this is also denoted using dotted lines 210. In addition to the logical topology, the Grid representation also includes delay information for each Logical Inter-Plane and Intra-Plane Crosslink. Delays are minimum near the polar region and maximum in the equator region. This delay attribute is the cost metric in route computation.

The algorithm for determining the nearest center determination for all snapshots is given below.

```
for each snapshot t
    { for each payload p
        { s = the logical node occupied by p during t;
          D = the set of logical nodes where each node covers a
              management center;
          Compute shortest paths from s to each node in D;
          P = the set of shortest paths thus computed;
          d = the logical node in D such that the shortest path
              between s and d is the shortest among all paths in P;
          Nearest center for p during t = management center under
              the coverage area of d
        }
    }
```

The complexity of the above algorithm is $O(t*p*n**2)$, where t is the number of snapshots, p is the number of payloads, and n is the number of logical nodes.

The algorithm can be performed on a special or general purpose computer and the algorithm may be embodied as a program, software, or computer or computer instructions stored in a computer or machine usable or readable storage medium or device which causes the computer or machine to perform the steps of the algorithm when executed on the computer, processor, and/or machine.

Primary-backup relationships among centers are also determined by the NOC for each snapshot. A backup management center assumes management authority for the payloads managed by a primary center when the primary fails or is unable to communicate with payloads. A backup center that assumes new authority for a set of payloads communicates this event to those payloads.

Thus, in this scheme, payload-management center associations vary with time in a pre-determined fashion. The time based schedule of management associations for a payload is distributed to all relevant management centers and the payload prior to payload launch.

The distributed management scheme described in this invention has the following advantages:

1. Management traffic traverses fewer crosslinks and management communication latency is reduced. Only management traffic that has real-time requirements traverses crosslinks. Other management traffic traverses only an uplink or a downlink. Routes for management traffic traversing crosslinks are determined based on shortest path computations using crosslink delays as cost metric. This ensures that management communication latency is as minimal as possible.

2. Utilization of crosslinks for management traffic (overhead traffic) is reduced, and more crosslink capacity is available for user traffic.

3. Key management required for secure management associations between payloads and management centers is not too hard since all potential management associations are known in advance.

4. Since the management center is fixed for routine interactions with a payload, it is possible for the designated fixed center to perform performance data aggregation and summarization for that payload and send the aggregated and summarized information to the central NOC.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions stored in a computer or machine usable or readable storage medium or device, which causes the computer or machine to perform the steps of the method when executed on the computer, processor, and/or machine. A computer readable storage medium or device may include any tangible device that can store a computer code or instruction that can be read and executed by a computer or a machine. Examples of computer readable storage medium or device may include, but are not limited to, hard disk, diskette, memory devices such as random access memory (RAM), read-only memory (ROM), optical storage device, and other recording or storage media.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

While there has been described and illustrated a method and system for a distributed management arrangement for LEO satellite networks, it will be apparent to those skilled in the art that variations and modifications are possible without deviating from the broad principles and teachings of the present invention which shall be limited solely by the scope of the claims appended hereto.

What is claimed is:

1. A method for a distributed management arrangement for Low Earth Orbit (LEO) satellite networks, including a Network Operations Center (NOC), a plurality of distributed management centers (DMC) and a plurality satellites, comprising:

the NOC determining, prior to launch, the satellites under the management jurisdiction of each DMC, and providing this information to the satellites and DMCs;

the NOC uploading configuration information to satellites and receiving status and performance information from satellites via the respective DMCs;

each DMC exchanging routine management information with associated satellites at fixed times only via an uplink and a downlink; and a DMC nearest to a satellite exchanging time sensitive information with the respective satellite at the time instant at which the information is needed.

2. The method of claim 1, where routine management information includes periodic satellite configuration updates and periodic satellite performance and status information.

3. The method of claim 1, where time sensitive information includes satellite alarms and critical updates to satellite configuration.

4. The method of claim 1, where a DMC exchanges routine information with satellites in one or more orbit planes.

5. The method of claim 1, where the exchange of routine management information is fixed according to a time schedule and only when the associated DMC is in the coverage area of the satellite.

6. The method of claim 1, where the NOC determines, prior to launch, the associations between satellites and DMCs for routine management information exchange.

7. The method of claim 1, where the NOC determines, prior to launch, the nearest DMC for each satellite for different time instants.

8. The method of claim 1, where the nearest DMC is the DMC that can be reached from the satellite with the fewest number of crosslink hops.

9. A system for a distributed management arrangement for Low Earth Orbit (LEO) satellite networks comprising:
   a network of satellites;
   a network operations center (NOC) for determining before launch the associations between satellites and distributed management centers (DMC)s for routine management information exchange, and the nearest DMC that can be reached from each satellite for different time instants; and
   a plurality of distributed management centers (DMC) in information receiving relationship with the network operations center and associated with respective satellites at different time instants;
      wherein a DMC exchanges routine management information with associated satellites at fixed times based on information received from the NOC; and
      the DMC nearest to a respective satellite exchanging time sensitive information with the respective satellite at the time instant at which the information is needed.

10. A non-transitory computer readable storage medium storing a program of instructions executable by a machine to perforin a method for a distributed management arrangement for Low Earth Orbit (LEO), satellite networks, including a Network Operations Center (NOC), a plurality of distributed management centers (DMC) and a plurality of satellites, comprising:
   each DMC exchanging routine management information with associated satellites at fixed times; and
   a DMC nearest to a respective satellite exchanging time sensitive information with the respective satellite at the time instant at which the information is needed.

11. A non-transitory computer readable storage medium storing a program of instructions executable by a machine to perform a method for a distributed management arrangement for Low Earth Orbit (LEO) satellite networks, including a Network Operations Center (NOC), a plurality of distributed management centers (DMC) and a plurality of satellites, comprising:
   the NOC determining, prior to launch, the satellites under the management jurisdiction of each DMC, and providing this information to the satellites and DMCs;
   the NOC uploading configuration information to satellites and receiving status and performance information from satellites via the respective DMCs;
   each DMC exchanging routine management information with associated satellites at fixed times only via an uplink and a downlink; and
   a DMC nearest to a satellite exchanging time sensitive information with the respective satellite at the time instant at which the information is needed.

* * * * *

UNITED STATES PATENT AND TRADEMARK OFFICE
CERTIFICATE OF CORRECTION

| | | |
|---|---|---|
| PATENT NO. | : 8,644,323 B2 | Page 1 of 1 |
| APPLICATION NO. | : 13/368131 | |
| DATED | : February 4, 2014 | |
| INVENTOR(S) | : Natarajan et al. | |

It is certified that error appears in the above-identified patent and that said Letters Patent is hereby corrected as shown below:

In the Specification

In Column 1, Line 48, delete "muted" and insert -- routed --, therefor.

In the Claims

In Column 9, Line 25, in Claim 9, delete "(DMC)s" and insert -- (DMCs) --, therefor.

In Column 10, Line 6, in Claim 10, delete "perforin" and insert -- perform --, therefor.

In Column 10, Line 7, in Claim 10, delete "(LEO)," and insert -- (LEO) --, therefor.

Signed and Sealed this
Thirty-first Day of March, 2015

Michelle K. Lee
*Director of the United States Patent and Trademark Office*